United States Patent [19]

Chen

[11] Patent Number: 5,371,455
[45] Date of Patent: Dec. 6, 1994

[54] CONTROL CIRCUIT FOR SAFE CHARGING A RECHARGEABLE BATTERY

[75] Inventor: Shih-Chao Chen, Taipei, Taiwan, Prov. of China

[73] Assignee: Champion Freeze Drying Co., Ltd., Taipei, Taiwan, Prov. of China

[21] Appl. No.: 134,320

[22] Filed: Oct. 8, 1993

[51] Int. Cl.[5] .................................................. H02J 7/00
[52] U.S. Cl. .......................................... 320/26; 320/48
[58] Field of Search ............................ 320/25, 26, 48

[56] References Cited

U.S. PATENT DOCUMENTS

| | | | |
|---|---|---|---|
| 4,423,456 | 12/1983 | Zaidenweber | 320/25 X |
| 4,520,419 | 5/1985 | Locher et al. | 320/25 X |
| 4,546,302 | 10/1985 | Smith | 320/25 |
| 4,571,533 | 2/1986 | Dey | 320/25 |
| 4,701,688 | 10/1987 | Guim | 320/25 |
| 4,740,740 | 4/1988 | Taranto et al. | 320/26 |
| 4,769,586 | 9/1988 | Kazmierowicz | 320/26 |
| 4,868,706 | 9/1989 | Zaderej | 320/25 X |
| 4,876,496 | 10/1989 | Duncan | 320/25 X |

*Primary Examiner*—Kristine L. Peckman
*Attorney, Agent, or Firm*—W. Wayne Liauh

[57] ABSTRACT

A control circuit for safe charging a rechargeable battery comprising a forced short-circuit switch, a safety switch, an automatic change switch, a first rectification circuit, a second rectification circuit, a reverse-polarity detection circuit, a charging-signal output circuit, an oscillation circuit, and a condition-indicating signal assembly. Power supply can be provided from a conventional charging device or a spare battery. During the charging operations, the reverse-polarity detection circuit is used for detecting the correct polarity connection; when reverse polarity was connected, the automatic change switch will correct the polarity by indication the occupance of such condition with the indicating lamps in the condition-indicating signal assembly so as to provide a smooth and safe battery recharging.

3 Claims, 2 Drawing Sheets

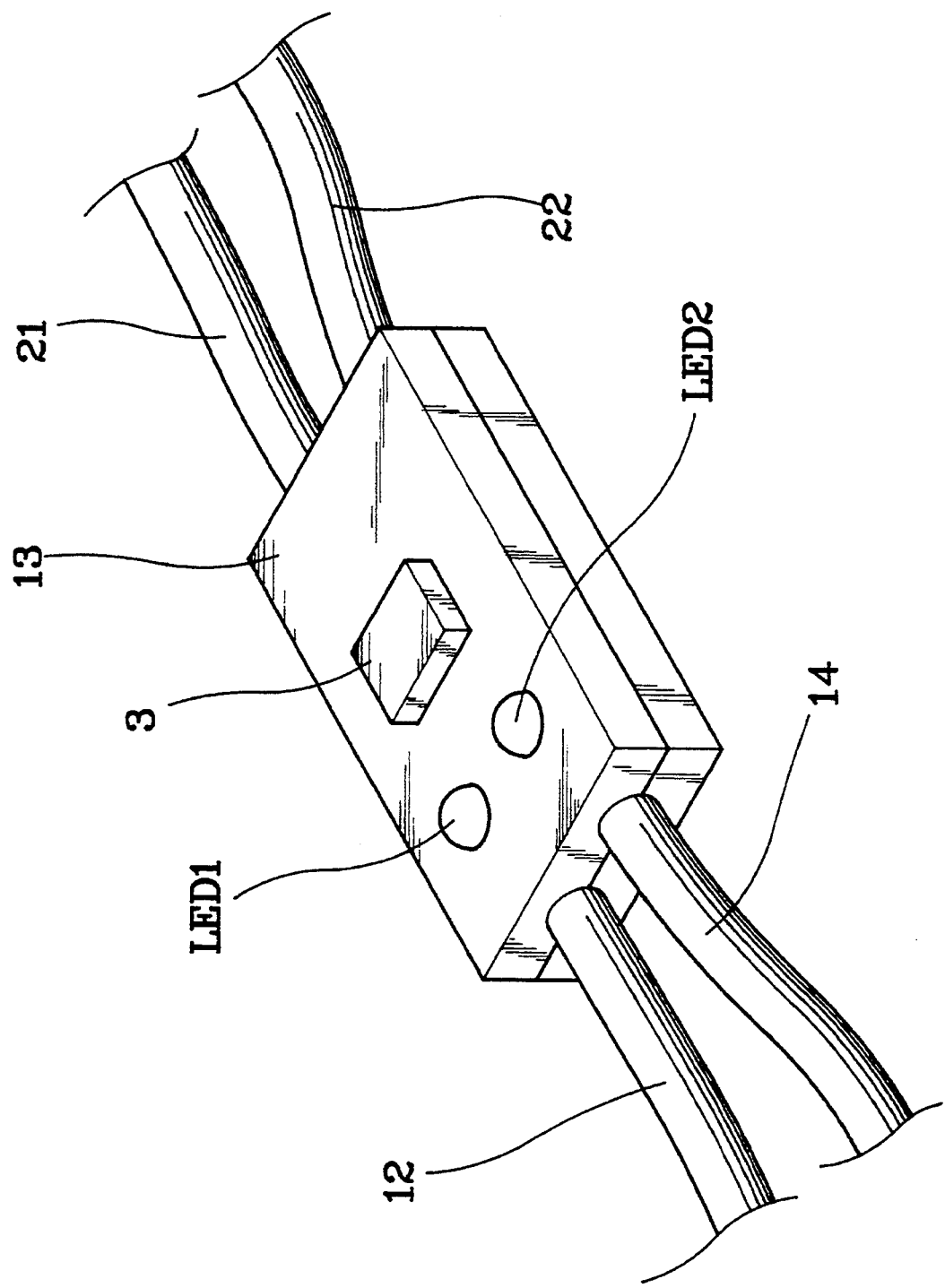

CONTROL CIRCUIT FOR SAFE CHARGING A RECHARGEABLE BATTERY

BACKGROUND OF THE INVENTION

A rechargeable battery is an important storage device of electric power, many devices, such as automobiles, motorcycles, agricultural machines and some spare power supply systems, depend upon such device. However a rechargeable battery is merely a power-storage device to supply a given amount of electric power, and is not a generator. In order to maintain its normal function, a rechargeable battery has to be connected with a power supply, such as a charging device or another battery for recharging.

Generally, it is not true that every user knows correctly about the positive and negative terminals of a rechargeable battery and about how to connect such a rechargeable with a recharging device. If a charging device is not well-designed or indicated correctly with a lamp or lamps, the user might damage the charging equipment and the battery, or even cause an accident.

For example, when the battery of a car is out of order, the car would be unable to start; then, another battery from another car has to be used to jump start the car. When the batteries of two cars are connected, the connection method looks simple, but danger might take place if the polarities of the two batteries are connected incorrectly. In that case, not only the battery will fail to supply the power desired, but the computer circuit and the battery might also be damaged. Moreover, serious accidents might result.

In a car repair shop, the repairman would use a special charging circuit to charge the battery of a car. For a novice repairman, the aforesaid danger might happen in case of negligence or failure to indicate the positive and negative terminals.

SUMMARY OF THE INVENTION

This invention relates to a control circuit for safe charging a rechargeable battery which primarily comprises a forced short-circuit switch, a safety switch, an automatic change switch, a first rectification circuit, a second rectification circuit, a reverse-polarity detection circuit, a charging signal output circuit, an oscillation circuit, and a condition-indicating signal assembly. By means of the aforesaid structure, the electric power of a charging device or a spare battery can be safely charged into a battery to be charged. In a charging operation, the reverse-polarity detection circuit can detect the circuit, and can cause the automatic change switch to change the polarity in case the terminal are connected reversely. The operation condition will be indicated by means of the indicating lamps of the condition-indicating signal assembly. The primary object of the present invention is to provide a control circuit, which is able to identify whether the polarity is correct or not by means of the reverse-polarity detection circuit to detect the charging circuit (such as a charging circuit or a spare battery) and a battery to be charged instead of using visual method to detect the polarity.

Another object of the present invention is to provide a control circuit, which has an automatic change switch for exchanging connections of the positive and negative terminals in case of the polarities between the charging circuit and the battery to be charged do not match, i.e., the positive and negative terminal can be exchanged automatically to avoid accident to take place.

Still another object of the present invention is to provide a control circuit, which has a condition-indicating signal assembly to indicate the charging condition; as soon as a battery is fully charged, a light signal (such as winking) will indicate the condition. When the positive and negative terminals are connected incorrectly a reverse indicating lamp will warn the incorrect condition so as to enable a user to control the charging operation completely.

A further object of the present invention is to provide a control circuit, which is installed in a casing two leads are extended from one end of the casing to connect to a charging circuit, while another two leads are extended from another end thereof to connect to a battery to be charged; a plurality of indicating lamps are mounted on the casing to enable a user to read the condition; a control knob is also furnished on the casing to enable a user to operate the same.

BRIEF DESCRIPTION OF THE DRAWINGS

FIG. 2 is a perspective view of an embodiment according to the present invention.

DETAILED DESCRIPTION

Figure 1:
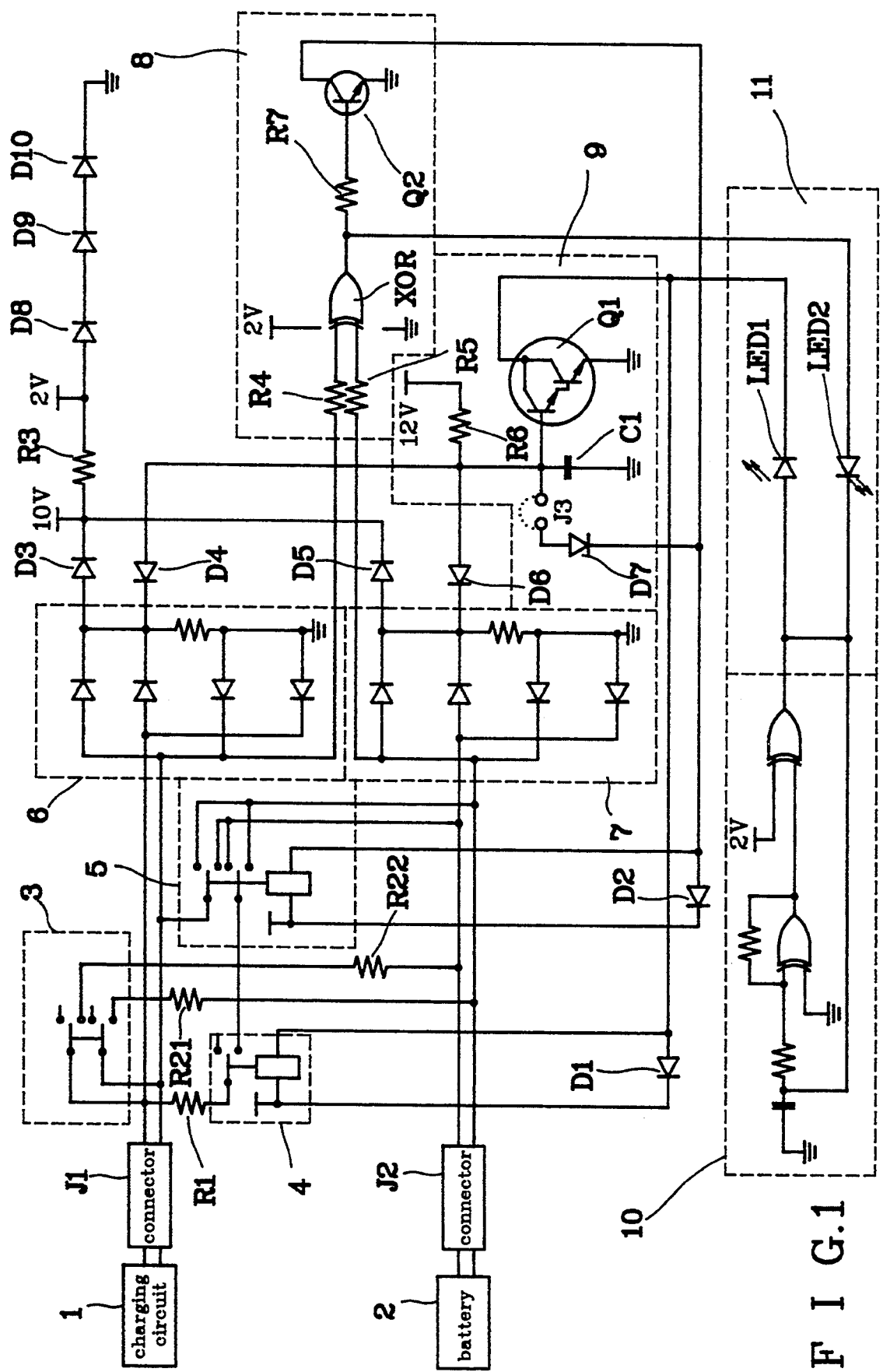
FIG. 1 is a control circuit according to the present invention.

The control circuit as shown in FIG. 1 comprises a charging device 1, a battery 2 to be charged, a forced short-circuit switch 3, a safety switch 4, an automatic change switch 5, a first rectification circuit 6, a second rectification circuit 7, a reverse polarity detection circuit 8, a charging signal output circuit 9, an oscillation circuit 10, and a condition-indicating signal assembly 11.

The charging device 1 is used to provide a charging current, and it can be a battery, or a conventional charging device. The power of the charging device is to be transmitted to the control circuit of the present invention through a connector J1. The battery 2 to be charged can receive charging current through a connector J2. In order to simplify the description, it is supposed that the upper lead is the positive electrode of the charging device 1, while the lower lead is the negative electrode thereof. Likewise, the upper lead of the battery 2 to be charged is the positive electrode, while the lower lead is the negative electrode thereof.

In real use, the charging device is considered a spare battery, or an output terminal of the generator of a car. All the aforesaid power supply sources can supply power to the battery to be charged.

The forced short-circuit switch 3 is a double-pole and single-throw switch, of which two terminals are connected with the positive and negative electrodes of the charging circuit 1 respectively, while the other two terminals are connected, through resistors R21 and R22, to the positive and negative electrodes of the battery 2 to be charged respectively. The forced short-circuit switch will never be turned on in the event that one of the two batteries has a voltage lower than 2.5 V because the circuit will not be able to sense its polarity. In that case, a user may start the recharging operation while the positive and negative electrodes are be connected inversely. The battery at such a low voltage presents a problem but the battery would not explode. When the switch is forced on, the charging circuit 1 will be directly connected with the battery 2 to be charged without going through the control circuit. The forced short-circuit switch is particularly useful when a car is unable to start because its battery fails to supply the required power. In that case, a user may turn on the switch 3 to have the charging circuit directly connected with the battery. As soon as the car is started, turn off the connection to the charging circuit; then, the car will continue to run as long as the engine of car runs.

The safety switch 4 includes a relay, a coil and switch contacts; the coil is controlled with a transistor Q1; one end of the coil is connected with a resistor R1 and the positive electrode of the charging circuit 1, while the other end thereof is connected with a common contact of the automatic change switch 5. The safety switch 4 is energized when the charging is started. The transistor Q1 is a Darlington pair.

The automatic change switch 5 includes a relay and two groups of switching contacts. The automatic change switch 5 is controlled with a transistor Q2 of a reverse-polarity detection circuit 8; the switch 5 will change from one group of switching contacts to the other group of switching contacts upon receiving a control signal from the reverse-polarity detection circuit 8; therefore, a user need not care the polarity thereof in real use; all he or she has to do is to have the charging circuit connected with the battery 2 to be charged.

The jumper J3 is used for by passing the function of a polarity-reversing relay. In the embodiment of the present invention, both the safety switch 4 and the automatic change switch 5 are using relays as switches respectively. Two terminals of the coils of relays are connected in series with two reverse diodes D1 and D2 respectively to prevent from having a wrong energizing condition.

In the present invention, there are two rectification circuits, i.e., a first rectification circuit 6 including four diodes, and a second rectification circuit 7; both circuits are full wave rectifiers. In the first rectification circuit 6, the input voltage is provided by connecting the charging device, while the positive output terminal can provide voltages of 10 V and 2 V by means of diodes D3, D8, D9, D10 and resistor R3 connected in series; the negative output terminal is connected with a voltage of 10 V through a reverse diode D4 and resistor R6.

The second rectification circuit 7 is also a full wave rectifier, the positive output terminal of which is connected with the positive output terminal of the first rectification circuit 6, and its negative output terminal is connected with a voltage of 10 V through a reverse diode D6 and a resistor R6.

The general user is usually unable to know the positive or negative polarity of wires from a charging circuit and a battery; therefore, the present invention is furnished with a reverse-polarity detection circuit 8 to detect the polarity automatically. The reverse-polarity detection circuit 8 includes an exclusive OR gate, three resistors R4, R5 and R7, and a transistor Q2. Two input terminals of the exclusive OR gate are connected with two over-voltage protection resistors R4 and R5 respectively, before being connected with the charging circuit 1 and the battery 2 to be charged respectively (being the negative electrodes as shown in FIG. 1). When the polarities between the charging circuit and the battery to be charged do not match the exclusive OR gate will generate a counter-polarity signal out the output terminal thereof; such signal will light up an indicating lamp LED2 of the condition-indicating signal assembly 11, and also will pass through resistor R7 to control the transistor Q2, of which the collector output will actuate a solenoid; in case the aforesaid polarity terminals are connected reversely, the reverse-polarity detection circuit 8 will detect the wrong connection, and will cause the automatic change switch 5 to change to correct polarities.

The charging-signal output circuit 9 includes a transistor Q1, a capacitor C1, and a resistor R6. The base terminal of the transistor Q1 is connected, through diodes D4 and D6, with the positive output terminals of the first and second rectification circuits 6 and 7 respectively, and then is connected with a 10 V through resistor R6. The collectors of Q1 are connected with the solenoid of the safety switch 4 to control the solenoid, and also connected with the a charge-indicating lamp of the condition-indicating signal assembly 11 to light up the lamp.

The condition-indicating signal assembly 11 includes a charge-indicating lamp LED1 and a reverse-connection indicating lamp LED2. The LED1 will be lighted up when the charging circuit begins to charge the battery; the LED2 will be lighted up when the reverse-polarity detection circuit 8 detects the charging circuit and the battery being connected in reverse polarity. Moreover, the condition-indicating signal assembly 11 includes an oscillation circuit 10, which enables the indicating lamps to wink.

FIG. 2 illustrates the control circuit being mounted in a charger casing 13 in real use. The aforesaid circuit parts are fitted in the casing 13, of which one end two leads 12 and 14 extend out of the charging circuit, while the other end two leads 21 and 22 extend out to connect the positive and negative electrodes of a battery to be charged. The top of the charger casing 13 is mounted with two indicating lamps LED1 and LED2 as shown in FIG. 1, and a forced short-circuit switch 3, which can be pushed down to operate by a user in case of being necessary.

I claim:

1. A control circuit for safe charging a rechargeable battery from a charging device, said battery and said charging device each having a positive terminal and a negative terminal, and said control circuit comprising:

a reverse-polarity detection circuit detecting whether the positive and negative terminals of said charging device are connected to the positive and negative terminals, respectively, of said battery to be charged, and, as soon as reverse terminal connection is detected, sending out a reverse-polarity control signal;

an automatic change switch having two groups of switching contacts, said automatic change switch being controlled by said reverse-polarity control signal from said reverse-polarity detection circuit, and said automatic change switch automatically switching said contacts upon receiving said control signal;

a first rectification circuit which is a full wave rectifier having a pair of first positive and negative output terminals with an input voltage provided by said charging device, and an output of one of 10 V and 2 V being provided from said first positive output terminal thereof;

a second rectification circuit which is a full wave rectifier having a pair of second positive and negative output terminals, and said second positive output terminal being connected with said first positive output terminal of said first rectification circuit;

a charging-signal output circuit including a transistor, said transistor having a transistor base connected with said first and second positive output terminals of said first and said second rectification circuits, via a diode, said transistor also being connected with a 10 V power supply, via a resistor;

a condition-indicating signal assembly including a charge-indicating lamp and a reverse-connection indicating lamp; said charge-indicating lamp being controlled by means of an output of said charging-signal output circuit, and said charge-indicating lamp being turned on when said battery is being charged by said charging device; said reverse-connection indicating lamp being turned on in case said charging device and said battery are in said reverse terminal connection; and a safety switch including a switch contact to be connected with one of said two groups of contacts in said automatic change switch in said charging circuit; said safety switch being energized upon charge being started.

2. A control circuit for safe charging a rechargeable battery as claimed in claim 1, which further comprising a forced short-circuit switch, said forced short-circuit switch having a double-pole and single-throw-switch and two groups of contacts; said two groups of contacts of said forced short-circuit switch being connected with said positive and negative terminals of said charging device and said battery to be charged, respectively.

3. A control circuit for safe charging a rechargeable battery as claimed in claim 1, wherein said reverse-polarity detection circuit includes an exclusive OR gate having two input terminals connected with two overvoltage protection resistors, which further being connected with a negative terminal of a second battery and said positive terminal of said battery being charged, respectively; in case of said negative terminal of said second battery and said positive terminal of said positive terminal of said battery being charged being incorrectly connected, said reverse-polarity detection circuit generating said reverse-polarity control signal; and a second transistor having a base terminal connected with a second resistor, and said second transistor being controlled by said reverse-polarity control signal from said reverse-polarity detection circuit; said second transistor having a collector terminal for controlling said automatic change switch.

* * * * *